(12) United States Patent
Thomas

(10) Patent No.: US 6,540,258 B1
(45) Date of Patent: Apr. 1, 2003

(54) DEVICE FOR INFLUENCING THE DEPLOYMENT OF A GAS BAG IN AN AIRBAG MODULE

(75) Inventor: Michael Thomas, Grosswallstadt (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/555,231
(22) PCT Filed: Nov. 23, 1998
(86) PCT No.: PCT/DE98/03494
§ 371 (c)(1), (2), (4) Date: May 24, 2000
(87) PCT Pub. No.: WO99/28163
PCT Pub. Date: Jun. 10, 1999

(30) Foreign Application Priority Data

Nov. 26, 1997 (DE) ...................................... 297 21 678 U (51) Int. Cl.$^7$ ............................................... B60R 21/24
(52) U.S. Cl. ..................................... 280/740; 280/743.2
(58) Field of Search .......................... 280/743.1, 743.2, 280/730.1, 729, 740, 736, 742

(56) References Cited

U.S. PATENT DOCUMENTS

| 4,006,918 A | | 2/1977 | MacFarland | 280/729 |
|---|---|---|---|---|
| 5,018,762 A | | 5/1991 | Suzuki et al. | 280/731 |
| 5,427,410 A | * | 6/1995 | Siota et al. | 280/743.1 |
| 5,464,250 A | | 11/1995 | Sato | 280/743.1 |
| 5,573,270 A | * | 11/1996 | Sogi et al. | 280/743.1 |
| 5,577,765 A | * | 11/1996 | Takeda et al. | 280/743.1 |
| 5,593,179 A | | 1/1997 | Maruyama | 280/740 |
| 5,632,506 A | * | 5/1997 | Shellabarger | 280/743.1 |
| 5,845,935 A | * | 12/1998 | Enders et al. | 280/743.2 |
| 5,913,535 A | * | 6/1999 | Taguchi et al. | 280/743.1 |
| 5,918,902 A | | 7/1999 | Acker et al. | 280/743.1 |
| 5,941,559 A | | 8/1999 | Rudolf et al. | 280/729 |
| 5,944,342 A | * | 8/1999 | White, Jr. et al. | 280/743.1 |
| 5,988,677 A | | 11/1999 | Adomeit et al. | 280/740 |

FOREIGN PATENT DOCUMENTS

| DE | 2030863 | 12/1971 |
|---|---|---|
| DE | 41 42 326 | 6/1993 |
| DE | 44 42 202 | 5/1996 |
| DE | 195 06 886 | 8/1996 |
| DE | 296 06 709 | 9/1996 |
| DE | 196 11 541 | 9/1997 |
| EP | 0 586 131 | 3/1994 |
| EP | 0 593 010 | 4/1994 |
| EP | 0 593 172 | 4/1994 |
| EP | 0 600 598 | 6/1994 |
| EP | 0 803 411 A1 | 10/1997 |
| EP | 0 878 358 | 11/1998 |
| FR | 2 219 034 | 9/1974 |
| GB | 2 265 118 | 9/1993 |
| JP | 6-22155 | 3/1922 |
| JP | 6-22115 | 3/1994 |
| JP | 09-164899 | 6/1997 |
| JP | 09-263204 | 10/1997 |
| JP | 09-277891 | 10/1997 |
| JP | 10-100826 | 4/1998 |

* cited by examiner

Primary Examiner—Brian L. Johnson
Assistant Examiner—Christopher Bottorff
(74) Attorney, Agent, or Firm—Foley & Lardner

(57) ABSTRACT

A device for influencing the deployment of a gas bag in an airbag module wherein the gas bag and/or at least one limiting band in the area of the outlets of a gas generator or diffuser forms, together with said outlets, a channel with outlets for influencing the outflowing gas after the gas generator is ignited.

19 Claims, 10 Drawing Sheets

DEVICE FOR INFLUENCING THE DEPLOYMENT OF A GAS BAG IN AN AIRBAG MODULE

The invention relates to a device for influencing the deployment of a gas bag of an airbag module.

BACKGROUND OF THE INVENTION

The deployment of the gas bag must be controlled, for example to improve its out of position (OOP) behavior, especially in cases with additional means in which the gas flows out in such a way that the gas bag is not deployed uniformly, or not symmetrically, in the direction of the occupant, or is deflected unintentionally in a certain direction, and more especially in cases in which the outflow openings on the generator are not provided in the middle of the module but are provided asymmetrically with respect to the middle of the module. An example of this is that of most hybrid gas generators for passenger airbag modules. Various solutions for influencing the deployment of a gas bag of an airbag module have become known.

For instance, DE 44 42 202 A1 discloses a passenger airbag module which, for influencing the gas flowing into the gas bag, is equipped with different diffusers, which have greater outflow openings in the direction of the desired main direction of deployment of the gas bag.

DE-A-2 030 863 discloses the provision of tearing seams for influencing the deployment of the gas bag. In this case, the gas bag can, in a first phase, be deployed up to a size which the intact tearing seams allow. Increasing internal pressure in the subsequent second phase causes the tearing seams to tear, and the gas bag can then be deployed up to its full size.

DE 195 06 886 and EP-A-0 593 010 A1 disclose airbag modules in which retaining straps are provided for the directed deployment of the gas bag. These extend from the gas generator to different locations of the gas bag, without influencing the flow of the gases leaving the gas generator or the diffuser. The retaining straps influence the deployment of the gas bag only on the basis of their different lengths and their fastening locations on the gas bag. It is also the case with these airbag modules provided with retaining straps that the flow of the gases is influenced by means of the diffusers.

The means previously provided for influencing the expansion of the gas bag during its deployment require considerable additional expenditure.

Finally, U.S. Pat. No. 5,464,250 discloses a gas bag in which two retaining straps are provided in the region of the gas generator, extend in their width through virtually the entire gas bag and, together with the wall of the gas bag, form a channel for the gases leaving the gas generator. This retaining strap arrangement is only appropriate, however, for gas bags which are flat after deployment, as is the case with gas bags for side airbags, so that the retaining straps are short.

SUMMARY OF THE INVENTION

The invention is based on the object of reducing the expenditure for influencing the expansion of a gas bag independently of the form of the gas bag during its deployment.

In a device for influencing the expansion of a deploying gas bag of an airbag module, the gas bag and/or at least one retaining strap in the region of the outflow openings of a gas generator or diffuser form(s) together with said openings a channel with outflow openings for influencing the gas flowing out after the gas generator is ignited.

This solution is particularly advantageous whenever at least one retaining strap is provided in any case. In this solution, in addition to its customary function, the retaining strap undertakes the influencing of the flow in a predetermined direction or in a plurality of predetermined directions. The solution may be used in addition to a diffuser or as a substitute for a diffuser. By means of this solution, the stress values for the OOP position of an occupant can be reduced. In addition, the solution can always be used advantageously if the deployment or expansion direction of the gas bag has to be influenced.

In a first embodiment, using a tubular gas generator, two retaining straps are provided, extending in their width over a predetermined portion of the length of the tubular gas generator, a first retaining strap extending from one side of the tubular gas generator as far as the location of the gas bag to be influenced in its expansion by the retaining strap, while the second retaining strap extends from the opposite side of the tubular gas generator and is connected to the first retaining strap above the outflow openings of the tubular gas generator or of the diffuser. In this embodiment, between the gas generator and the two retaining straps there is consequently formed a channel into which the gases of the gas generator flow and are deflected there.

In a second embodiment, only one retaining strap is provided, wrapping around the gas generator with one end. This end is then connected to the retaining strap above the outflow openings of the gas generator or the diffuser. In this way, a channel is consequently formed between two portions of the retaining strap and the gas generator.

It is expedient that the second retaining strap or the wrapping-around end of the single retaining strap is connected over the entire retaining strap width to the first retaining strap or to the retaining strap itself or to the gas bag. In this case, a channel which is closed over its entire length and from which the gas can leave only at the end faces is produced. It is also possible, however, to provide at the connecting location an interrupted connection or individual punctiform connections, so that part of the gas can also leave the channel at the sides.

A channel may also be formed without retaining straps, by opposite sides of the gas bag being connected to each other over the gas generator or diffuser. The connection does not take place over the entire width of the gas bag, so that openings through which the gas leaving the gas generator can flow into the gas bag remain free at the ends of the seam.

The connection may take place, for example, by sewing, welding, adhesive attachment or by means of a touch-and-close fastener, it being possible for a single seam or multiple seam to be provided.

The course followed by the connection location may be chosen according to the desired outlet direction of the gases. The connecting location may therefore follow a linear or two-dimensional course.

A further embodiment provides that the channel has a differing cross-sectional size over its length. This makes it possible to influence the velocity of the gas, so that a diffuser action is also achieved by means of this retaining strap device.

In one embodiment, the channel has an enlarging cross section in a desired preferable direction of expansion of the gas bag.

In a further embodiment, it is provided that the retaining strap and/or the retaining straps or one of the retaining straps have clearances in the region in which they form the channel. In this case, the gas can, as in an embodiment with an interrupted seam, also leave the channel at the sides. In this embodiment, the diffuser action is further intensified.

In a further embodiment, it is provided that the longitudinal edges of the retaining strap or of the two retaining straps, extending from the connecting location of the end of the retaining strap with itself or extending from the connecting location of the second retaining strap with the first retaining strap are connected to each other over a predetermined length in the direction of the gas generator. This produces in addition to the channel a shaft in which part of the gas flowing out from the gas generator is initially intercepted. This fraction of the gas then flows out of the channel with a delay. This embodiment consequently allows still further influencing of the gases flowing out. This embodiment may also be modified to the extent that the connection running in the direction of the gas generator is interrupted and begins at a distance from the connection of the two retaining straps. This produces additional outflow openings for the gas.

Since the retaining straps are additionally subjected to the hot gas in the region of the gas generator, it is expedient for the retaining straps to have different thicknesses or, if one retaining strap is used, for the end of the retaining strap wrapping around the gas generator to be strengthened.

As a departure from the embodiment represented, when using two retaining straps the two part retaining straps may vary in their length and form and do not have to be made identical or similar.

In one embodiment it is provided that the connecting location of the end of the retaining strap with itself or of the second retaining strap with the first retaining strap is designed as a tearing seam. In this case, the connection of the retaining strap end or of the two retaining straps is initially used for diverting the gas in the desired direction. Subsequently, the connection tears open partially or completely.

The deployment characteristics of the gas bag may also be influenced by the combinations of connections or part connections of the retaining straps arranged vertically, horizontally, obliquely or in a curved manner.

BRIEF DESCRIPTION OF THE DRAWINGS

The invention is to be explained in exemplary embodiments on the basis of drawings, in which.

DETAILED DESCRIPTION

Figure 1:
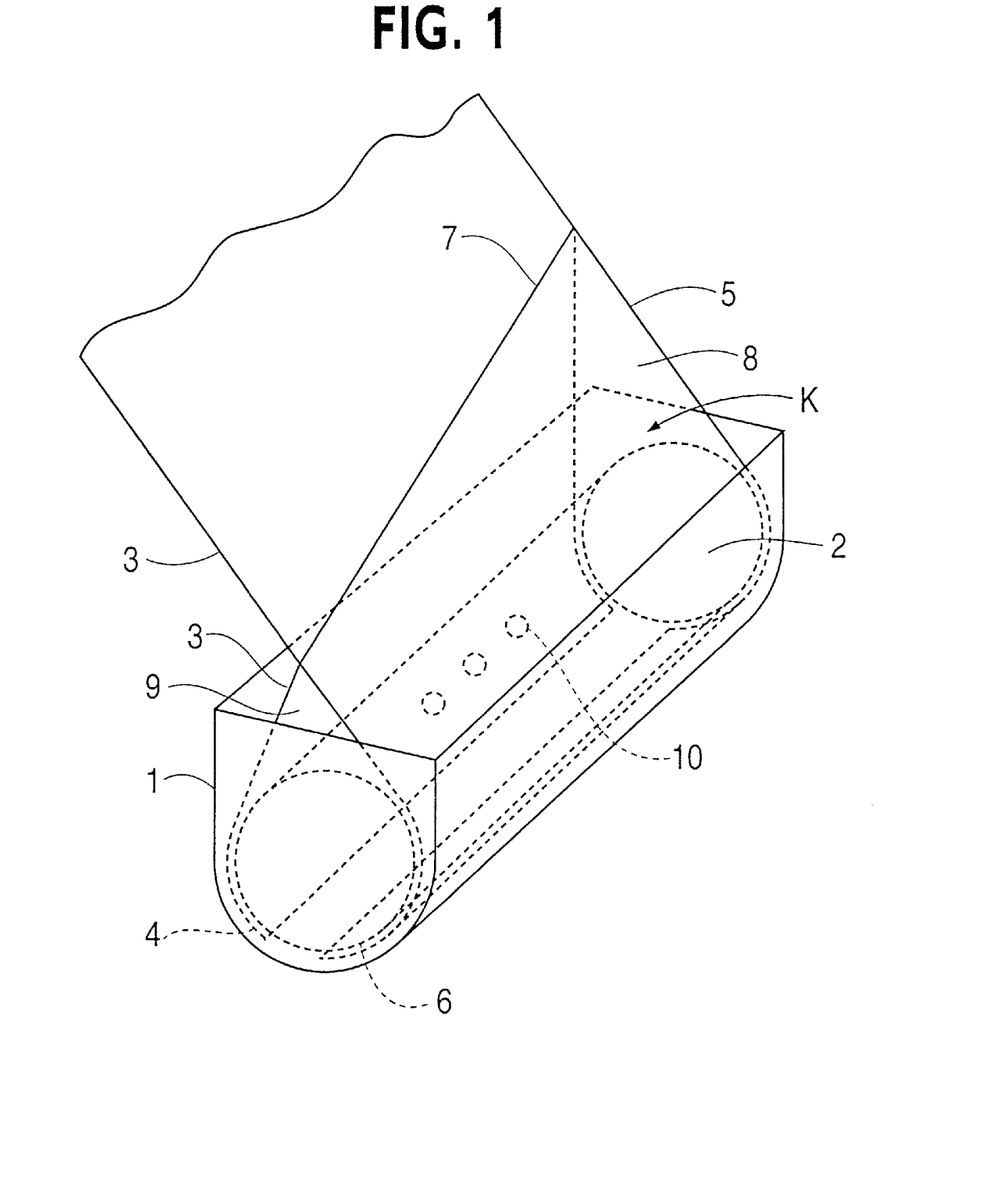
FIG. 1 shows a first embodiment with two retaining straps.
Figure 8:
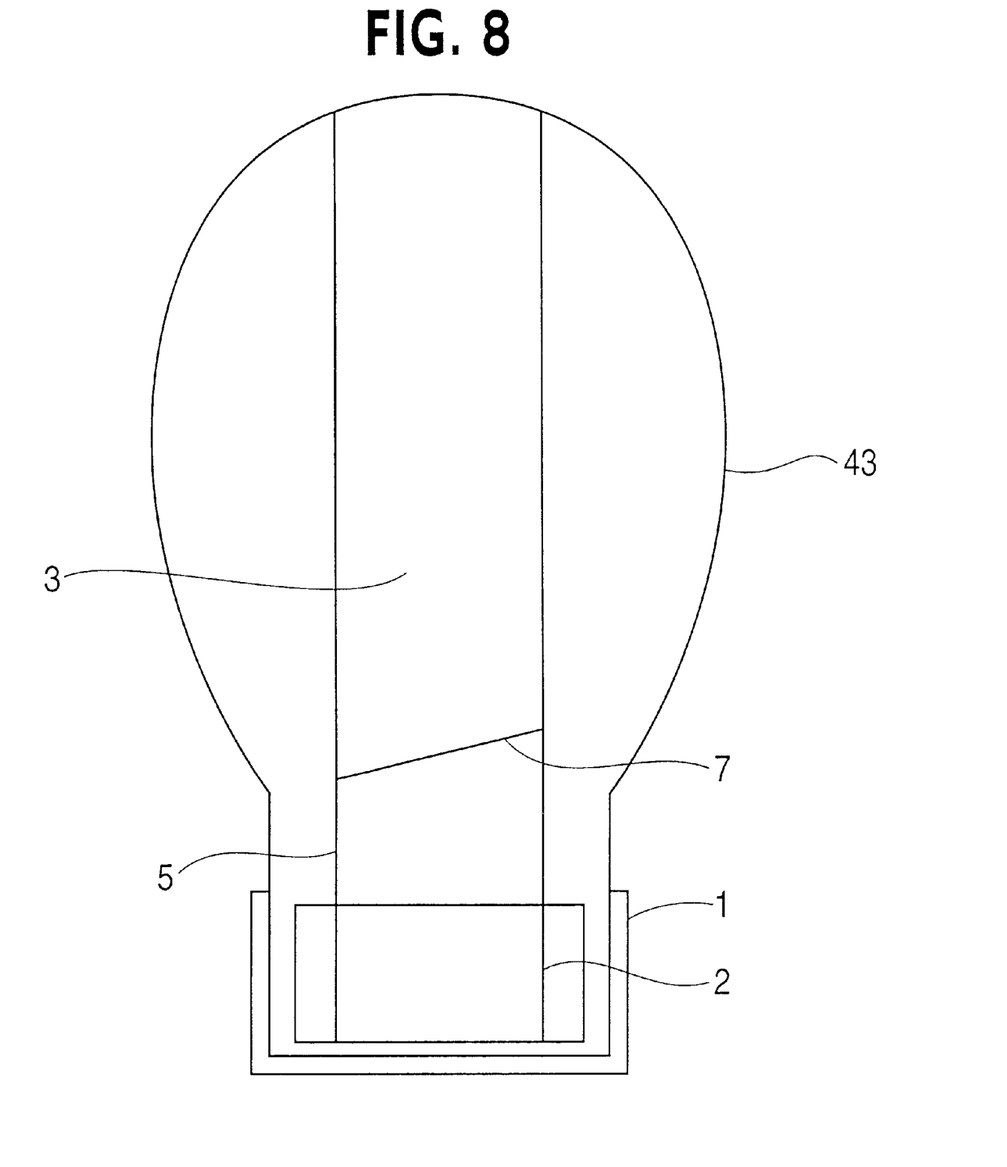
FIG. 8 is a side view of the embodiment of FIG. 1 showing a retaining strap connected to a gas bag.

In the exemplary embodiment of FIG. 1, a housing 1 for a tubular gas generator 2 is arranged with a gas bag (not represented) of an airbag module. In the region of the tubular gas generator 2, a first retaining strap 3 is connected with one end of the retaining strap in the region of the bottom of the housing to the gas bag by means of seam 4. The retaining strap may, for example, be sewn, riveted or adhesively attached there. This retaining strap is fastened with its other end at a predetermined location of the gas bag, at which the latter is to be limited in a known way in its expansion during deployment. The connection between the retaining strap 3 and the gas bag 43 is shown in FIG. 8.

A second retaining strap 5 is fastened on the opposite side of the tubular gas generator 2 to the gas bag by means of a seam 6. This retaining strap preferably extends only as far as a seam 7, by means of which it is fastened to the first retaining strap 3. The connection expediently takes place by sewing. The seam 7 runs obliquely with respect to the longitudinal axis of the tubular gas generator, so that on the right-hand side represented in FIG. 1 an outflow opening 8 is larger than an outflow opening 9 on the left-hand side, between which openings there extends a channel K, which is bounded by the housing of the tubular gas generator 2 and the retaining straps 3 and 5.

With this arrangement of two retaining straps, the direction of expansion of the gas leaving the outflow openings 10 of the tubular gas generator 2 can be influenced. This has the consequence that the direction of expansion of the gas bag can be influenced in a similar way. The retaining strap arrangement consequently assumes the function of a diffuser. The deployment characteristics of the gas bag are in this case determined by the course of the seam 7. Depending on the position of the outflow openings of the gas generator, a symmetrical or asymmetrical deployment of the gas bag can be achieved.

Figure 2:
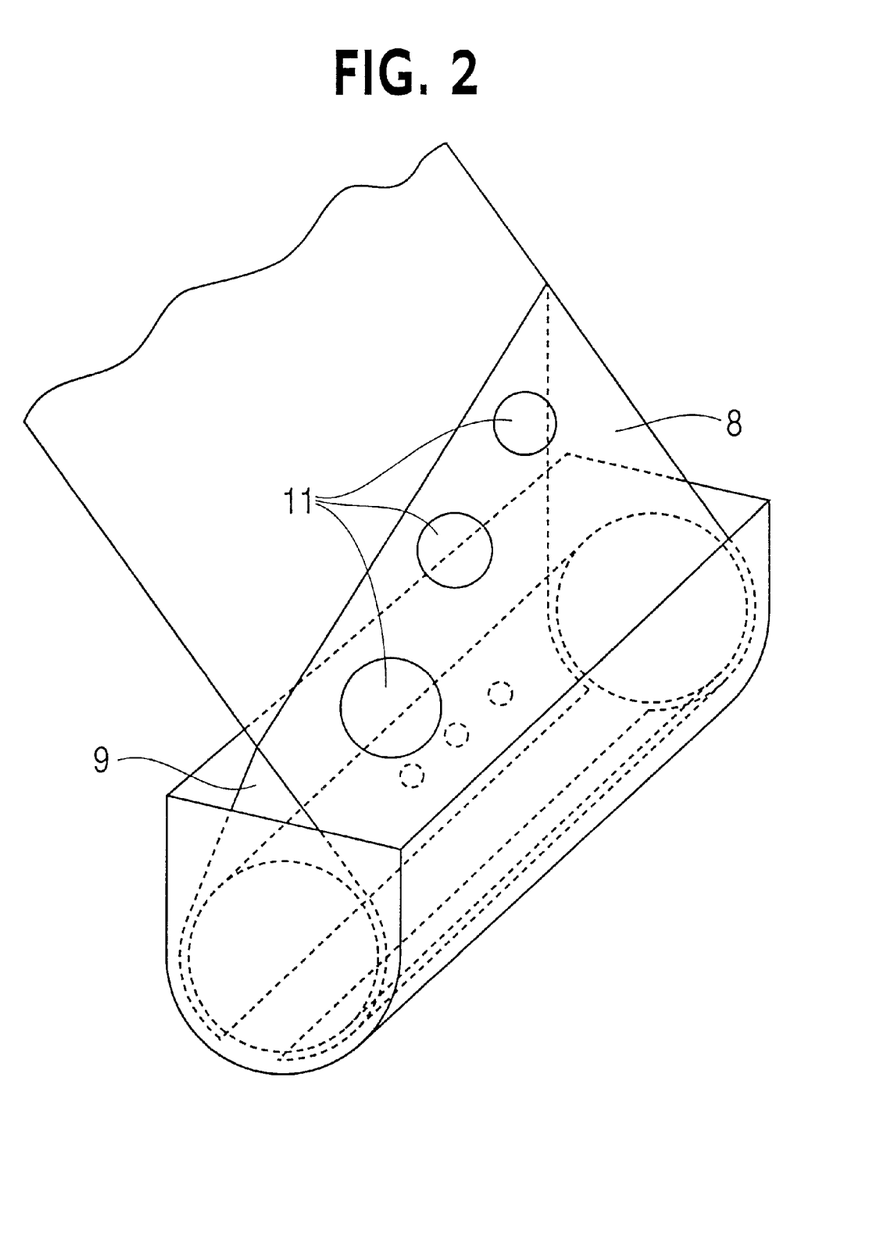
FIG. 2 shows a second embodiment with two retaining straps with additional outflow openings in one retaining strap.

The embodiment of FIG. 2 corresponds in the arrangement of the retaining straps to that of FIG. 1. In addition, in this embodiment clearances 11 of different sizes are provided in the lower retaining strap 5. As a result, part of the gas can enter the gas bag without deflection, while the other part, as in the embodiment of FIG. 1, leaves through the lateral outflow openings 8 and 9 after deflection. Consequently, by these clearances 11, which may also be equal in size, and the size and position of which are to be fixed appropriately for the intended deployment characteristics of the gas bag, and which may also be provided in the upper retaining strap, the deployment of the gas bag can be influenced to a still greater extent than with the embodiment of FIG. 1.

Figure 3:
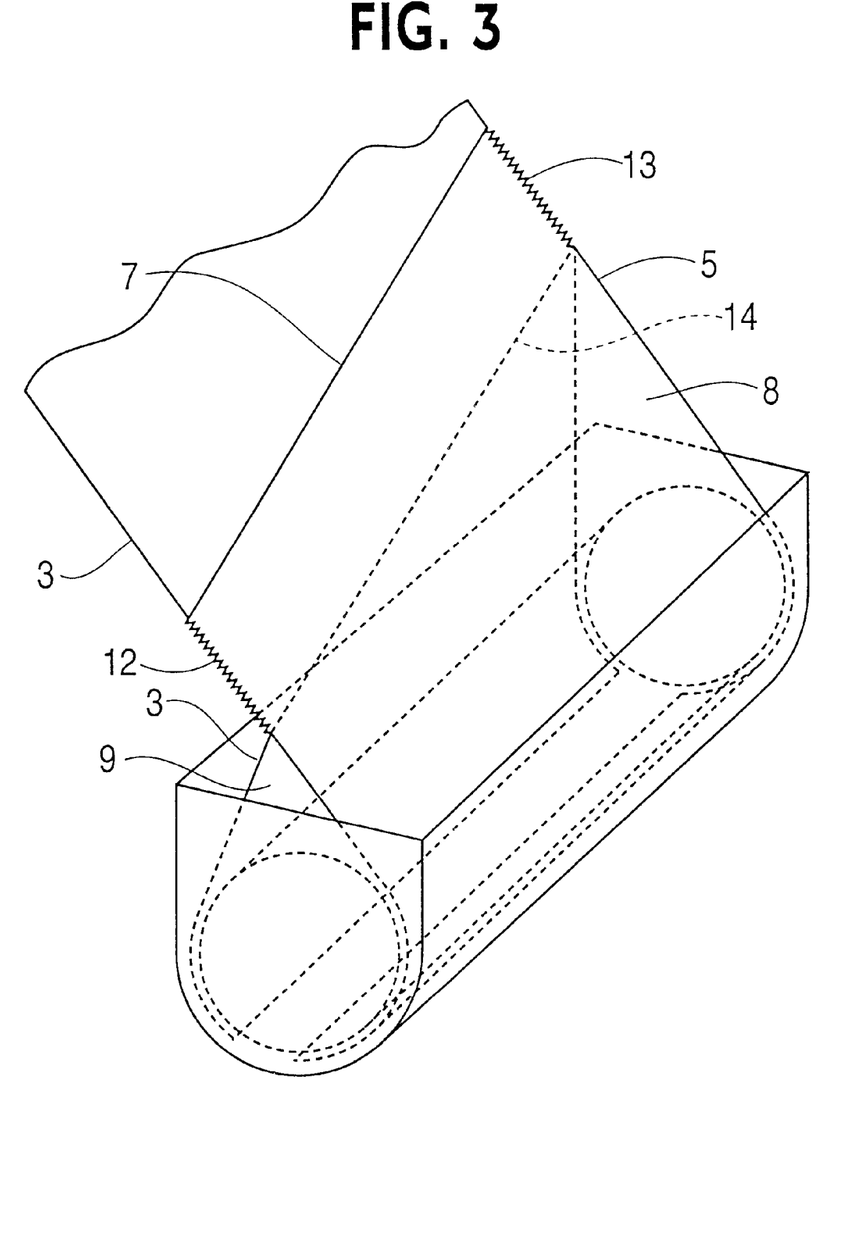
FIG. 3 shows a third embodiment with two retaining straps and an additional shaft.

In the embodiment of FIG. 3, the lateral edges of the first retaining strap 3 and of the second retaining strap 5, extending from the transversely running seam 7 in the direction of the gas generator, are connected to each other over a predetermined length by seams 12, 13. As a result, a shaft into which the gas leaving the gas generator can enter is produced, extending from a line of inflection 14 of the first retaining strap 3 up to the seam 7. The seam 7 prevents the escape of gas in the upward direction. It remains there until the pressure under the shaft has reduced to the extent that the gas can likewise escape from the shaft from the outflow openings 8, 9. Diverting the gas to the sides of the module or in the upward or downward direction achieves the effect that the gas bag initially expands less in the direction of an occupant directly in front of the module. Particularly favorable results can be achieved in conjunction with a gas bag folded to the side of the gas generator.

Figure 4:
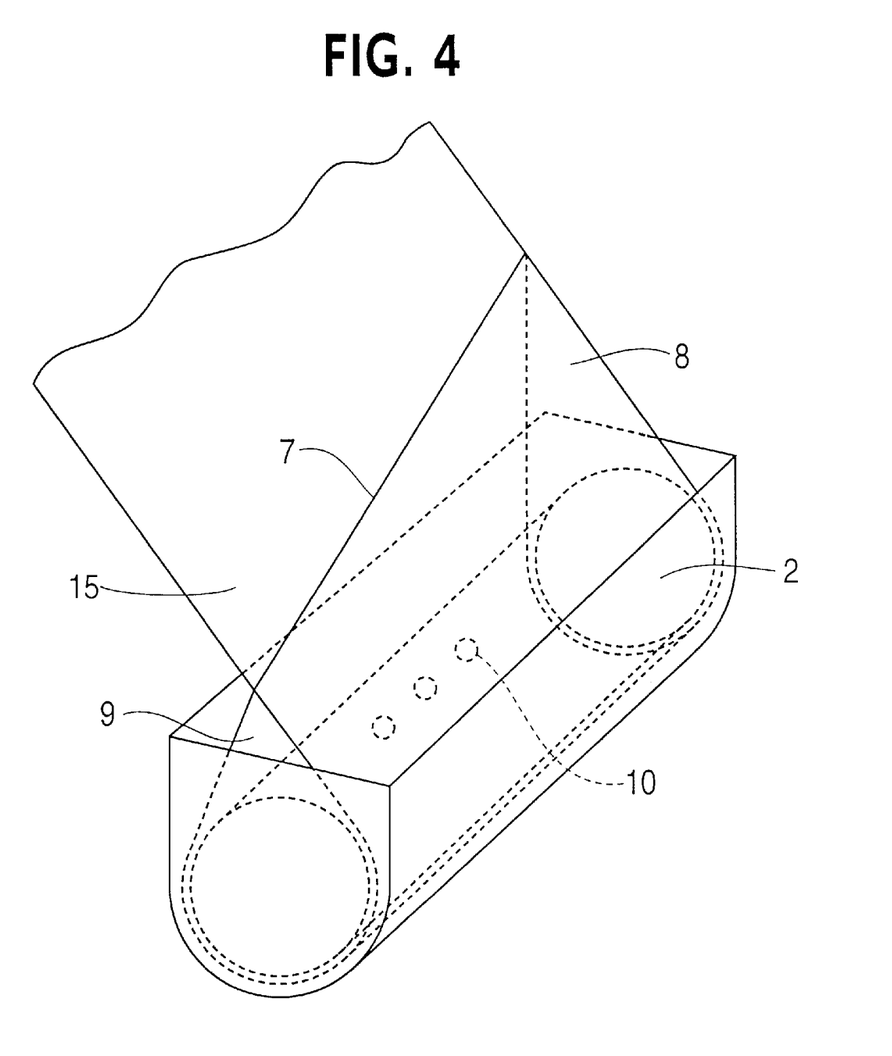
FIG. 4 shows an embodiment with one retaining strap.

In the previous embodiments, two retaining straps were used. In the embodiment of FIG. 4, only one retaining strap 15 is provided. This is led around the tubular gas generator 2 and the end of the retaining strap is connected above the tubular gas generator 2 to the retaining strap by means of the seam 7 in such way that, as in the embodiment of FIG. 1, there are outflow openings 8 and 9. This embodiment with one retaining strap may of course also be modified in a way corresponding to the embodiments of FIGS. 2 and 3, so that the additional advantages of the latter also come into effect here.

Figure 5A:
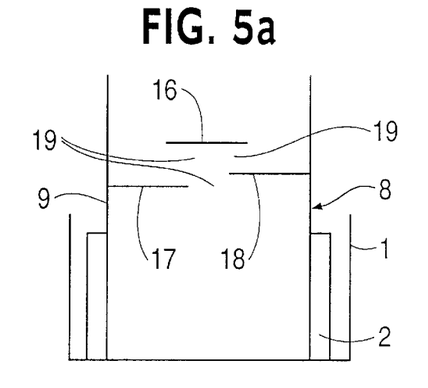
FIGS. 5a–h show different courses of seams at the connecting location of two retaining straps in a side view.
Figure 5B:
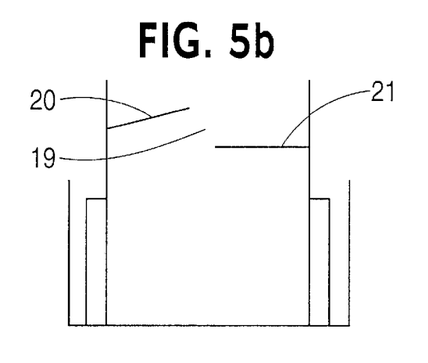
Figure 5C:
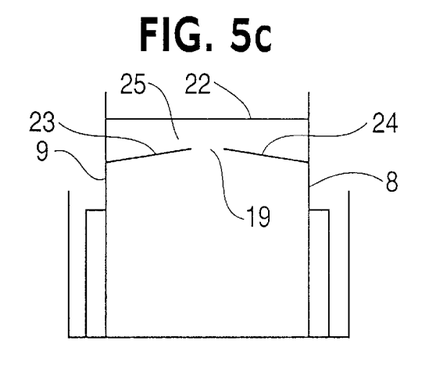

Different courses of seams at the connecting location of two retaining straps are schematically represented in FIGS. 5a–5c. In the embodiment of FIG. 5a, three seams 16, 17, 18 are arranged parallel to and at a distance from one another, the seams not extending over the entire width of the retaining straps 3, 5. Gas can escape through the intermediate spaces 19 between the seams.

In the embodiment of FIG. 5b, seams 20, 21 run in different directions, the seams not extending over the entire width of the retaining straps in this case either, so that there is likewise an intermediate space 19 through which gas can flow into the gas bag.

In the embodiment of FIG. 5c, a continuous seam 22 and, at a distance from the latter, two seams 23, 24 are provided, said two seams not extending over the entire width of the retaining straps, so that there is an intermediate space 19. In this embodiment, there is a shaft 25, into which gas can enter through the intermediate space 19. The continuous seam 22 prevents escape in this direction into the gas bag, so that the gas has to flow from the shaft through the outflow openings 8, 9 into the gas bag.

Figure 5D:
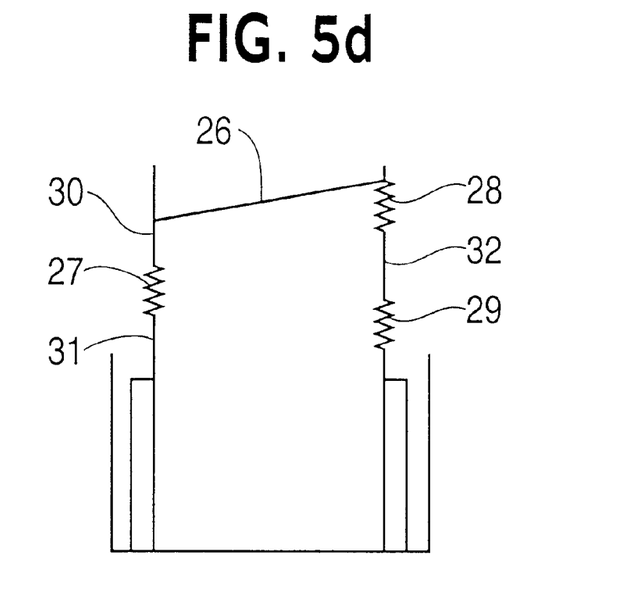

In the embodiment of FIG. 5d, in addition to a continuous seam 26, the edges of the retaining straps are connected to each other by means of seams 27, 28 and 29. As a result, on one side there are two outflow openings 30, 31 and on the other side there is one outflow opening 32, through which the gas can enter the gas bag. By changing the length of the seams, and consequently changing the intermediate spaces, the inflation characteristics of the gas bag can be changed.

Figure 5E:
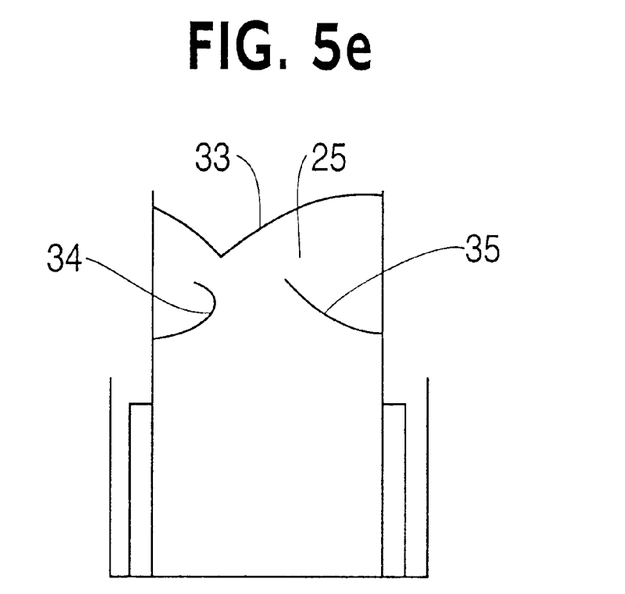

FIG. 5e shows an embodiment in which there are an arcuately running seam 33 and, in addition, two seams 34, 35, so that a shaft 25 is formed in a way similar to in the embodiment of FIG. 5c.

Figure 5F:
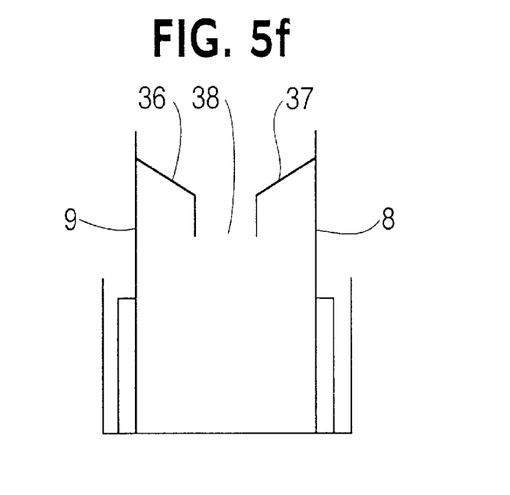

In the embodiment of FIG. 5f, two angular seams 36, 37 are provided, between which there is an outflow opening 38 in addition to the outflow openings 8, 9.

Figure 5G:
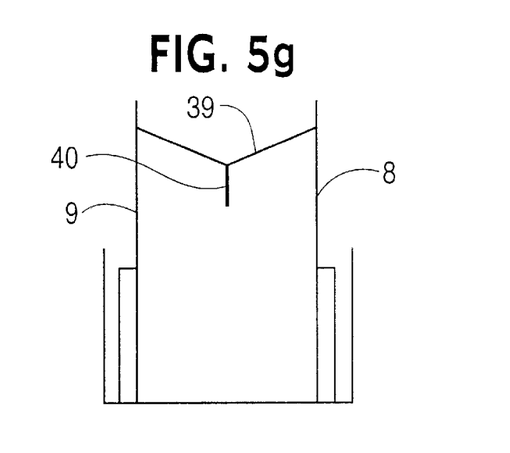

Represented in FIG. 5g is an embodiment in which an angular seam 39 is supplemented by a vertically running seam 40, which influences the flow through the outflow openings 8, 9.

Figure 5H:
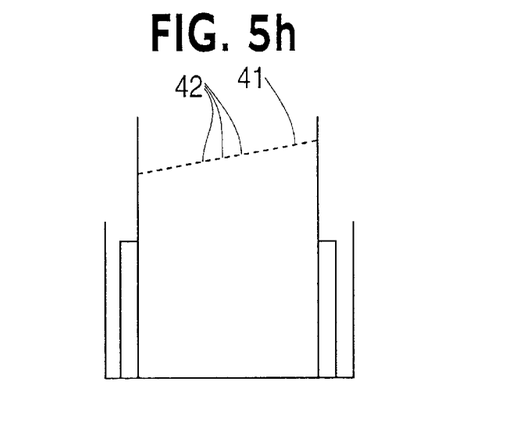

Finally, represented in FIG. 5h is an embodiment in which a seam 41 is made in a punctiform manner, i.e. there are a plurality of punctiform connecting locations with intermediate spaces 42, through which gas can likewise flow into the gas bag.

Figure 6:
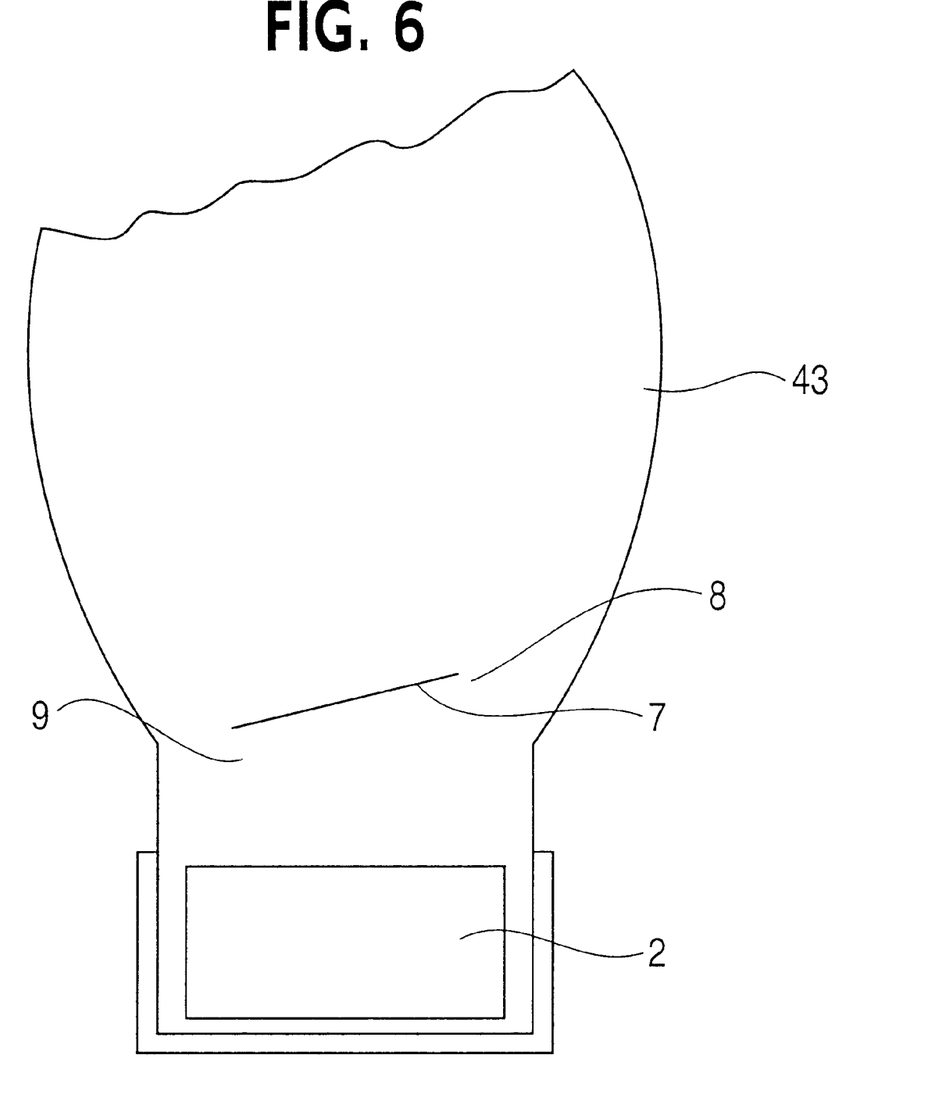
FIG. 6 shows an embodiment in which opposite sides of the gas bag are connected to each other over the gas generator.

In the embodiment of FIG. 6, opposite sides of a gas bag 43 are connected to each other by a seam 7, the gas bag not being sewn together over its full width.

Figure 7:
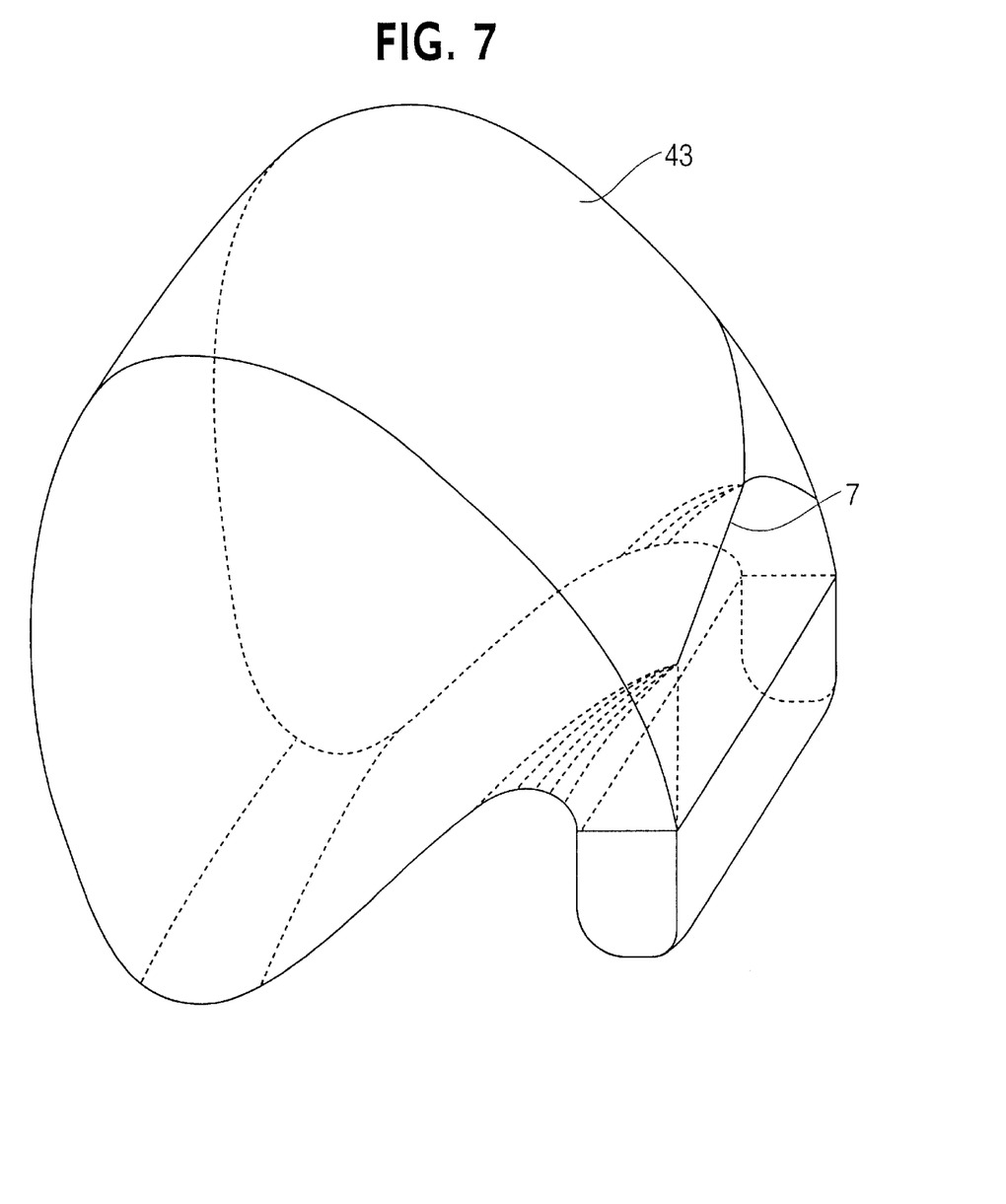
FIG. 7 shows a perspective view of the embodiment according to FIG. 6.

As a result, without using a retaining strap, there is above the gas generator 2 likewise a channel with outflow openings 8 and 9, through which gas can flow into the gas bag in the direction of the occupant. In FIG. 7, the embodiment of FIG. 6 is represented once again perspectively with an inflated gas bag 43.

I claim:

1. A device for influencing the deployment of a gas bag of an airbag module, comprising a gas bag, at least one retaining strap, and a gas generator unit having outflow openings, wherein the at least one retaining strap is located to form together with said outflow openings, an asymmetrical channel with outflow openings for asymmetrically influencing gas flowing out after the gas generator unit is ignited, wherein the retaining strap extends from the gas generator unit and is connected to a portion of the gas bag remote from the gas generator unit and influences the deployment of the gas bag on the basis of its length and the connection location on the gas bag.

2. The device according to claim 1, wherein the gas generator unit includes a tubular gas generator and the at least one retaining strap is two retaining straps extending in their width over a predetermined portion of the length of the tubular gas generator, a first retaining strap of the two retaining straps extending from one side of the tubular gas generator as far as the location of the gas bag to be influenced in its expansion by the first retaining strap, while the second retaining strap of the two retaining straps extending from the opposite side of the tubular gas generator and connected to the first retaining strap above the outflow openings of the tubular gas generator.

3. The device according to claim 1, wherein one end of the retaining strap is wrapped around the gas generator unit, and the wrapped one end of the retaining strap is connected to the retaining strap above the outflow openings of the gas generator unit.

4. The device according to claim 2 or 3, wherein the second retaining strap or the wrapped one end of the single retaining strap is connected over the entire retaining strap width to the first retaining strap or to the retaining strap (15) itself or to the gas bag.

5. The device according to claim 2 or 3, wherein the second retaining strap or the wrapped one end of the single retaining strap is connected in certain portions to the first retaining strap or to the retaining strap itself or to the gas bag.

6. The device according to claim 2 or 3 wherein the connection is a sewn, welded, adhesively attached or touch-and close fastener connection.

7. The device according to claim 1 wherein the channel has a differing cross-sectional size over its length.

8. The device according to claim 1 wherein the channel has an enlarging cross section in the desired preferable direction of expansion of the gas bag.

9. The device according to claim 2 or 3 wherein the retaining strap or the retaining straps have clearances in the region in which the channel is formed.

10. The device according to claim 9, wherein the clearances are of different sizes and/or different shapes.

11. The device according to claim 2 or 3 wherein the longitudinal edges of the retaining strap or of the two retaining straps are connected to each other over a predetermined length in the direction of the gas generator unit.

12. The device according to claim 2 wherein the retaining straps have different thicknesses.

13. The device according to claim 2 or 3 wherein the connecting location of the end of the retaining strap with itself or of the second retaining strap with the first retaining strap is designed as a tearing seam.

14. The device according to claim 2 or 3, wherein the connecting location of the end of retaining strap with itself or of the second retaining strap with the first retaining strap follows a linear or two-dimensional course.

15. The device according to claim 2 or 3, wherein at the connecting location of the end of retaining strap with itself or of the second retaining strap with the first retaining strap, an interrupted connection is provided or individual puncti-form connections are provided.

16. The device according to claim 1 wherein the gas generator unit includes a gas generator having said outflow openings or a diffuser having said outflow openings.

17. The device according to claim 3 wherein the wrapped one end of the retaining strap wrapping around the gas generator unit is strengthened.

18. The device according to claim 1 wherein the gas bag and the at least one retaining strap are located to form together with said outflow openings a channel with outflow openings for influencing the gas flowing out after the gas generator unit is ignited.

19. A device for influencing the deployment of a gas bag of an airbag module, comprising a single gas bag and a gas generator unit having gas generator outflow openings, wherein opposite sides of the gas bag are connected together above the gas generator unit to form an asymmetrical channel bounded by the connection of the opposite sides and having airbag outflow openings for influencing gas flowing from the channel.

* * * * *